(12) United States Patent
Chou

(10) Patent No.: US 7,045,969 B1
(45) Date of Patent: May 16, 2006

(54) INVERTER CIRCUIT CAPABLE OF ADJUSTING POWER FACTOR

(75) Inventor: Chin-Wen Chou, Hsin-Tien (TW)

(73) Assignee: Zippy Technology Corp., Hsin-Tien (TW)

( * ) Notice: Subject to any disclaimer, the term of this patent is extended or adjusted under 35 U.S.C. 154(b) by 0 days.

(21) Appl. No.: 10/995,257

(22) Filed: Nov. 24, 2004

(51) Int. Cl.
*H05B 41/16* (2006.01)

(52) U.S. Cl. .................. 315/247; 315/209 R; 315/244; 315/276; 315/291; 315/307; 315/DIG. 4; 363/97; 363/131; 310/318

(58) Field of Classification Search .......... 315/209 PZ, 315/209 R, 200 R, 219, 276, 291, 307, 244, 315/247, 224, DIG. 4, DIG. 7; 363/95, 97, 363/98, 131, 132; 310/318, 319; 323/299, 323/301
See application file for complete search history.

(56) References Cited

U.S. PATENT DOCUMENTS

| 5,023,518 | A | * | 6/1991 | Mans et al. ................. 315/219 |
| 5,698,952 | A | * | 12/1997 | Stebbins ..................... 315/307 |
| 6,278,625 | B1 | * | 8/2001 | Boyd ......................... 363/132 |
| 6,864,644 | B1 | * | 3/2005 | Kernahan ................... 315/307 |

* cited by examiner

*Primary Examiner*—Haissa Philogene
(74) *Attorney, Agent, or Firm*—Birch, Stewart, Kolasch & Birch, LLP

(57) ABSTRACT

An inverter circuit capable of adjusting power factor transforms an AC signal of an electric power source to a pulse DC signal through a rectification unit and divides the duty cycle of minimum input voltage-maximum input voltage-minimum input voltage of the pulse DC signal to a plurality of continuous voltage pulses through an actuation unit so that a transformer outputs an altering duty cycle according to the resonant operation of each voltage pulse and enables a cold cathode lamp to blink in a dark-light-dark fashion to adjust the power factor without adding a power factor adjustment device.

5 Claims, 3 Drawing Sheets

INVERTER CIRCUIT CAPABLE OF ADJUSTING POWER FACTOR

FIELD OF THE INVENTION

The present invention relates to an inverter circuit that is capable of adjusting power factor and particularly to an inverter circuit that inputs a pulse DC signal to a transformer to adjust the power factor without adding an extra power factor adjustment device to stabilize voltage.

BACKGROUND OF THE INVENTION

The loads connected to the general city AC power, except the pure resistance loads such as incandescent lamps and electric stoves, most other loads include resistance and inductance. Hence the phase angle of the current of the electronic circuit lags the voltage. In general, the total current provided by the generator of the electric company through the electric transmission and distribution lines can be divided in effective current and ineffective current. As the rated voltage of each load is different, the electric meter at the user end indicates only the effective power (KW). But the ineffective power (KVAR) will cause line potential drop and line loss. This is a loss to the electric power company and user end. Hence how to adjust the power factor is an issue many electric user end system vendors are trying to resolve.

The technique of adjusting power factor can be divided into active type and passive type. Applying power factor adjustment can reduce electric loss, improve electric supply quality, increase life span of loads and save electricity consumption. The conventional approach for improvement is using capacitors. For instance, referring to FIG. 1, the present power supply vendors mostly provide a power factor adjustment device to stabilize output voltage. The drawing shows the operation voltage waveform of an inverter. After adjusting, the operation voltage becomes a continuous wave. But such an application mode creates troubles in some industries.

Take the inverter of a piezoelectric transformer as an example. As the operation output power of the inverter of the piezoelectric transformer is determined by the input voltage, with the present power supply mostly outputting a smaller voltage such as 24 or 48 volts, the output power of the inverter of the piezoelectric transformer also decreases. Moreover, the inverter of the piezoelectric transformer generates piezoelectric effect through vibration and mechanical stress of piezoelectric plates, when the power supply is activated, the piezoelectric plates have to maintain operation at 48 volts. As a result, the piezoelectric plates have to operate under a high voltage oscillation. This tends to shorten the life span of the inverter of the piezoelectric transformer.

SUMMARY OF THE INVENTION

The primary object of the present invention is to solve the aforesaid disadvantages. The invention provides an inverter circuit that can reduce the circuit cost without adding an extra power factor adjustment device. Through a rectification unit, an AC signal of an electric power source can be transformed to a pulse DC signal and an operation frequency is output through an actuation unit to divide the duty cycle of the minimum input voltage-maximum input voltage-minimum input voltage of the pulse DC signal into a plurality of continuous voltage pulses so that the transformer produces a resonance corresponding to each voltage pulse to output an altering duty cycle, and enables a cold cathode lamp to blink in a dark-light-dark manner according to the altering duty cycle. Thereby the inverter circuit can adjust the power factor without adding the power factor adjustment device.

Another object of the invention is to provide an inverter that can operate in a continuous voltage pulse wave while the voltage increases and decreases slowly to improve the high voltage oscillation occurred to the conventional inverter and maintain the desired life span of the inverter.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

The embodiment discussed below is based on an inverter of a piezoelectric transformer (operation of the inverter of the winding transformer is same as this embodiment, thus is omitted hereinafter).

Figure 1:
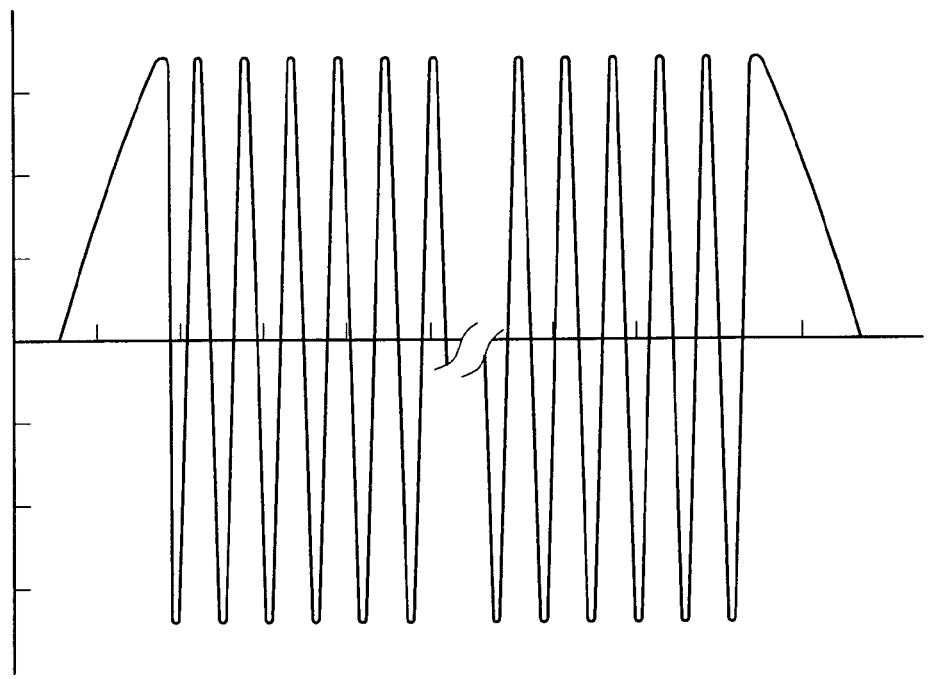
FIG. 1 is a schematic view of the input voltage waveform of an inverter of a conventional piezoelectric transformer.
Figure 2:
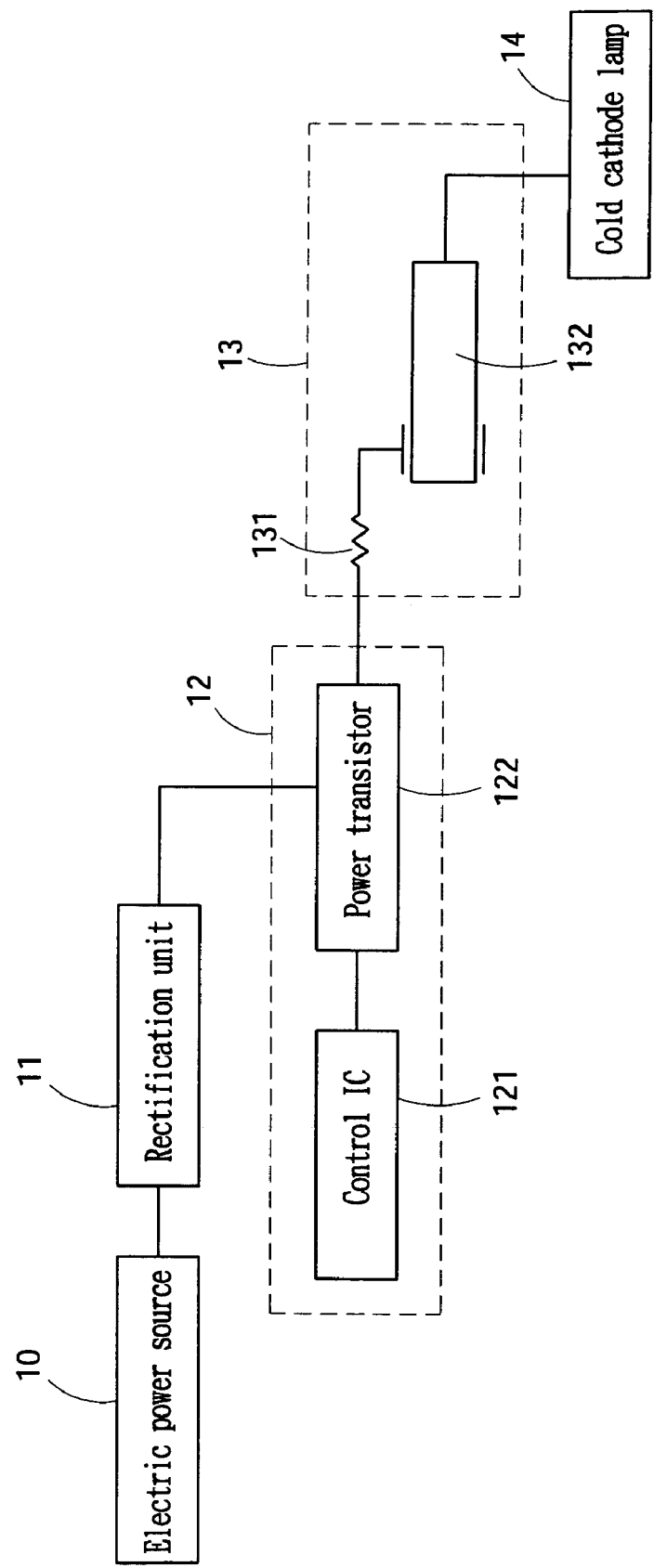
FIG. 2 is a circuit block diagram of the invention.

Refer to FIG. 2 for a circuit block diagram of the invention. The inverter of the invention aims to adjust the power factor of an electric power source 10 to fully utilize the electric power. It includes:

an electric power source 10 which provides an AC signal. The electric power source 10 may be city power or an external AC power that provides a maximum input voltage and a minimum input voltage during input;

a rectification unit 11 to receive the AC signal and transform to a pulse DC signal. It may be a full wave rectification circuit or a half wave rectification circuit consisting of a diode assembly according to requirements;

an actuation unit 12 to receive the pulse DC signal and output an operation frequency to divide the duty cycle of the minimum input voltage-maximum input voltage-minimum input voltage into a plurality of continuous voltage pulses. The actuation unit 12 consists of a control IC 121 and a power transistor 122 (MOSFET). The control IC 121 has a low voltage electric power source connecting to an external DC power. It outputs an operation frequency corresponding to a resonant frequency of a transformer 13 to drive the power transistor 122 to divide the duty cycle of the pulse DC signal. The divided voltage pulse wave is a square wave. And the continuous voltage pulse wave exists in a fashion of minimum input voltage-maximum input voltage-minimum input voltage that has the voltage increased or decreased slowly;

a transformer 13 to receive the pulse DC signal corresponding to each voltage pulse, and output a voltage according to the input voltage of each voltage pulse. The output voltage forms an altering duty cycle of minimum input voltage-maximum input voltage-minimum input voltage. In the invention, the transformer 13 is a piezoelectric transformer 13 including an inductance 131 and a piezoelectric plate 132 as an example; and a cold cathode lamp 14 to receive the output voltage to generate light. According to the altering duty cycle, the operation frequency of the cold cathode lamp 14 is divided to become an altering voltage in a low-high-low fashion. Hence the cold cathode lamp 14 blinks in a dark-light-dark fashion under the different voltage pulses.

Figure 3:
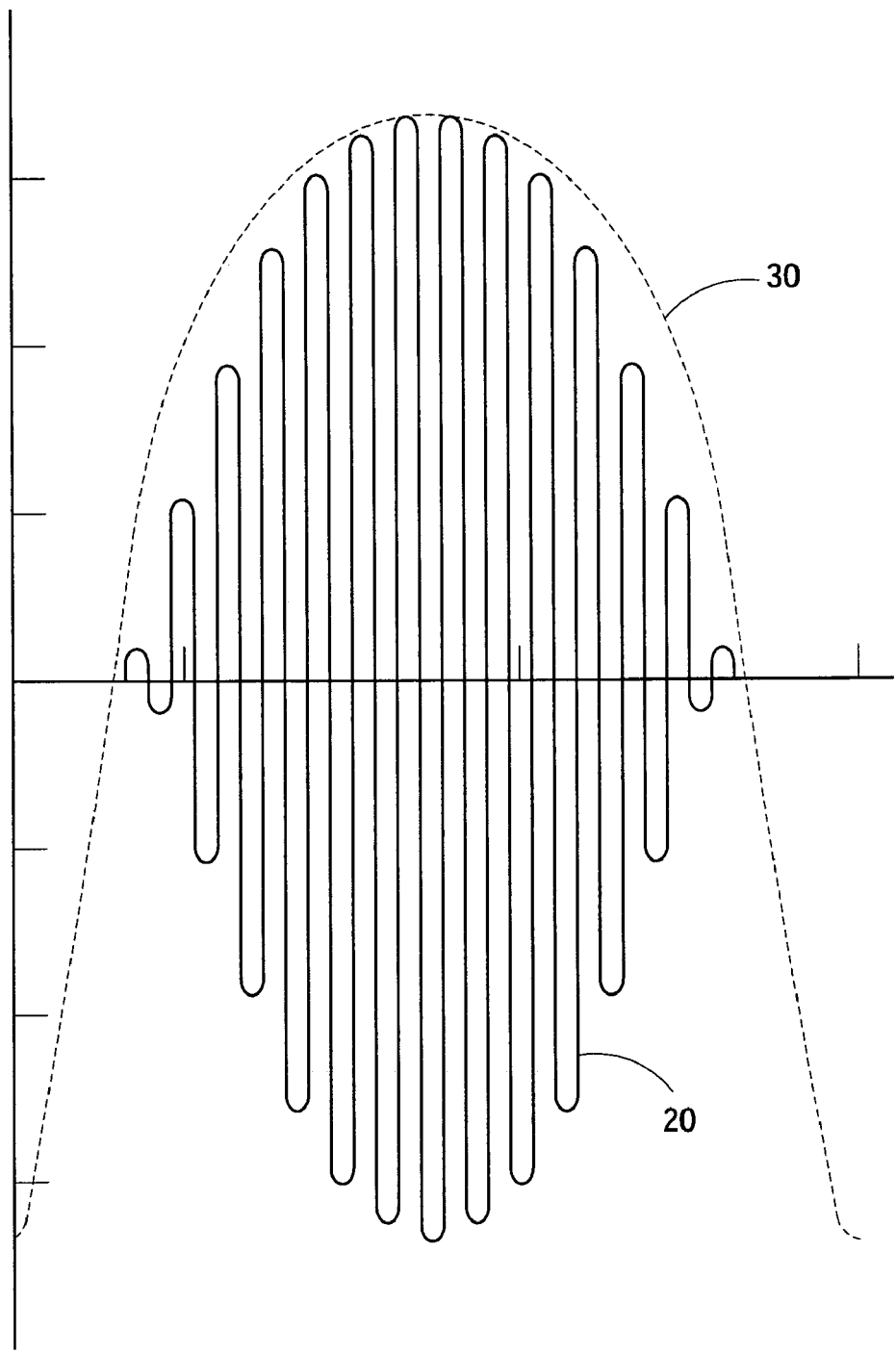
FIG. 3 is a schematic view of the operation voltage and output current waveform of the inverter of the invention.

Referring to FIG. 3, it clearly shows that all operation voltage 20 has a quasi-sinusoid waveform in the input operation to generate electric energy in the cold cathode lamp 14. Output current 30 is fully provided to the cold cathode lamp 14 for use, thus the current becomes an effective current. Hence the power factor may be adjusted as desired. In addition, the inverter of the piezoelectric transformer 13 starts operation from the minimum input voltage, and operates in a voltage oscillation mode of rising and falling slowing in a plurality of continuous voltage pulses formed by dividing the cycle of minimum voltage-maximum voltage-minimum voltage so that the life span of the inverter of the piezoelectric transformer 13 may be maintained as desired.

Setting the blinking frequency of the cold cathode lamp 14 has to be done according to the practical use of products. For instance, when the invention is adopted on a liquid crystal display panel of electronic products frequently seen by human eyes, the operation frequency has to be the blinking light acceptable to human eyes. It must be greater than 60 Hz. The higher operation frequency generates a blinking light that has a smaller effect to human eyes. In general, the operation frequency of the inverter of the piezoelectric transformer 13 is 72 Hz. Namely, the duty cycle of minimum voltage-maximum voltage-minimum voltage is divided to 1200 continuous voltage pulses. In each cycle the piezoelectric transformer 13 outputs power to drive and ignite the cold cathode lamp 14. Hence the cold cathode lamp 14 blinks in a dark-light-dark fashion. As the blinking is beyond the sensible level of human eyes, it does not produce any harmful effect to human eyes. When the invention is adopted for igniting neon lights, the operation frequency may be set lower than 60 Hz, then the blinking effect of the neon light immediately presents. The optimal approach is to adopt a half-wave rectifier 11, then an intermittent lighting may be generated.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An inverter circuit capable of adjusting power factor to improve utilization of an electric power source, comprising:
   an electric power source to provide an AC signal and a maximum input voltage and a minimum input voltage of the AC signal;
   a rectification unit to receive the AC signal and transform the AC signal to a pulse DC signal;
   an actuation unit to receive the pulse DC signal and output an operation frequency to divide the duty cycle of the minimum input voltage-maximum input voltage-minimum input voltage to a plurality of continuous voltage pulses;
   a transformer to receive the pulse DC signal corresponding to each voltage pulse and output a voltage according to the input voltage of each voltage pulse, the output voltage forming an altering duty cycle of the minimum input voltage-maximum input voltage-minimum input voltage; and
   a cold cathode lamp to receive the output voltage to generate light which blinks in a dark-light-dark manner according to the altering duty cycle.

2. The inverter circuit capable of adjusting power factor of claim 1, wherein the rectification unit is a full wave rectification circuit.

3. The inverter circuit capable of adjusting power factor of claim 1, wherein the rectification unit is a half wave rectification circuit.

4. The inverter circuit capable of adjusting power factor of claim 1, wherein the actuation unit consists of a control integrated circuit and a power transistor.

5. The inverter circuit capable of adjusting power factor of claim 1, wherein the transformer includes an inductance and a piezoelectric plate.

* * * * *